United States Patent
Cahill (10) Patent No.: US 10,422,663 B2
(45) Date of Patent: Sep. 24, 2019

(54) DISPLACEMENT SENSOR (71) Applicant: GOODRICH CORPORATION, Charlotte, NC (US)

(72) Inventor: Eric Daniel Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/987,703

(22) Filed: May 23, 2018

(65) Prior Publication Data

US 2018/0266850 A1   Sep. 20, 2018

Related U.S. Application Data

(62) Division of application No. 15/426,254, filed on Feb. 7, 2017, now Pat. No. 10,006,785.

(51) Int. Cl.
| | |
|---|---|
| *B64C 25/42* | (2006.01) |
| *G01D 5/16* | (2006.01) |
| *B60T 7/04* | (2006.01) |
| *B60T 7/08* | (2006.01) |
| *B60T 8/171* | (2006.01) |
| *B64C 25/34* | (2006.01) |
| *B64C 25/44* | (2006.01) |
| *H01C 10/30* | (2006.01) |
| *B60T 8/17* | (2006.01) |

(Continued)

(52) U.S. Cl.
CPC .............. *G01D 5/16* (2013.01); *B60T 7/042* (2013.01); *B60T 7/085* (2013.01); *B60T 8/17* (2013.01); *B60T 8/171* (2013.01); *B60T 8/1703* (2013.01); *B60T 8/409* (2013.01); *B60T 13/662* (2013.01); *B64C 25/34* (2013.01); *B64C 25/42* (2013.01); *B64C 25/44* (2013.01); *H01C 10/30* (2013.01); *B60T 8/3255* (2013.01); *B60T 13/74* (2013.01); *B60T 2220/04* (2013.01)

(58) Field of Classification Search
None
See application file for complete search history.

(56) References Cited

U.S. PATENT DOCUMENTS

| | | |
|---|---|---|
| 3,360,756 A | 12/1967 | Darley et al. |
| 4,623,868 A | 11/1986 | Pitcher |

(Continued)

FOREIGN PATENT DOCUMENTS

| | | |
|---|---|---|
| CA | 882366 | 9/1971 |
| CN | 102758962 | 10/2012 |
| EP | 0096948 | 12/1983 |

OTHER PUBLICATIONS

European Patent Office, European Search Report dated Jul. 6, 2018 in Application No. 18155608.5-1022.

(Continued)

*Primary Examiner* — Richard M Camby
(74) *Attorney, Agent, or Firm* — Snell & Wilmer L.L.P.

(57) ABSTRACT

A displacement sensor includes a resistive element and a wiper element. The wiper element is separated from the resistive element in a parked mode the wiper element is in sliding electrical contact with the resistive element in a sensing mode. A user input interface may be coupled to at least one of the resistive element and the wiper element, wherein whether the displacement sensor is in the parked mode or the sensing mode is dependent on actuation of the user input interface.

19 Claims, 6 Drawing Sheets (51) Int. Cl.
    *B60T 8/40*        (2006.01)
    *B60T 13/66*      (2006.01)
    *B60T 13/74*      (2006.01)
    *B60T 8/32*        (2006.01)

(56) References Cited

U.S. PATENT DOCUMENTS

| | | |
|---|---|---|
| 5,803,211 A | 9/1998 | Wilke |
| 6,471,015 B1 * | 10/2002 | Ralea .................. B60T 8/1703 188/1.11 L |
| 10,006,785 B1 * | 6/2018 | Cahill ...................... G01D 5/16 |
| 2009/0205910 A1 | 8/2009 | Cahill |
| 2010/0038188 A1 | 2/2010 | Cahill |
| 2011/0018337 A1 | 1/2011 | King et al. |

OTHER PUBLICATIONS

USPTO; Notice of Allowance dated Apr. 25, 2018 in U.S. Appl. No. 15/426,254.

* cited by examiner

DISPLACEMENT SENSOR

CROSS REFERENCE TO RELATED APPLICATIONS

This application is a divisional of, claims priority to and the benefit of, U.S. Ser. No. 15/426,254 filed Feb. 7, 2017 and entitled "DISPLACEMENT SENSOR," which is incorporated herein in its entirety for all purposes.

FIELD

The present disclosure relates to displacement sensors, and more specifically, to potentiometers.

BACKGROUND

Displacement sensors are used in different applications to measure the relative position of components. For example, displacement sensors can be used in the aircraft industry to measure displacement of the brake pedal. The measured displacement can then be converted into a braking command to be conveyed to a brake assembly.

There are many different types of displacement sensors. Potentiometers are one type of displacement sensors that can be coupled to a user input, such as a brake pedal, and utilized to detect the extent/amount/magnitude of user input. Potentiometers are multiple terminal resistors that can be used to measure electric voltage. A potentiometer can be calibrated so that a measured electric voltage can be correlated with a relative position of a movable electric contact of the potentiometer. However, due to conditions that are often present while operating an aircraft, potentiometers and other displacement sensors may fail due to excessive wear caused by vibrations propagating through contacting surfaces of the displacement sensors.

SUMMARY

In various embodiments, the present disclosure provides a displacement sensor that includes a resistive element and a wiper element. The wiper element may be separated from the resistive element in response to the displacement sensor being in a parked mode and the wiper element may be in sliding electrical contact with the resistive element in response to the displacement sensor being in a sensing mode. In various embodiments, a user input interface is coupled to at least one of the resistive element and the wiper element, wherein whether the displacement sensor is in the parked mode or the sensing mode is dependent on actuation of the user input interface.

According to various embodiments, the displacement sensor is configured to toggle between the parked mode and the sensing mode in response to actuation of the user input interface. The displacement sensor may default to the parked mode in response to no actuation of the user input interface and the displacement sensor may change to the sensing mode in response to a threshold actuation of the user input interface. The threshold actuation may be a deadband displacement of the user input interface. The user input interface may be a brake pedal or a brake handle, among others.

The displacement sensor may further include a controller such that, in response to the displacement sensor being in the sensing mode, the controller of the displacement sensor transmits a signal corresponding to a position of the wiper element relative to the resistive element. In various embodiments, the displacement sensor further includes an electrically nonconductive wiper lift element that is disposed between the wiper element and the resistive element in the parked mode. The electrically nonconductive wiper lift element may have an angled surface along which the wiper element slides (e.g., as the wiper element transitions between the parked mode and the sensing mode). In various embodiments, the resistive element is made from a conductive plastic. In various embodiments, the resistive element is made from a ceramic material.

Also disclosed herein, according to various embodiments, is a brake system that includes a displacement sensor and a brake pedal coupled to the displacement sensor. The displacement sensor may include a resistive element and a wiper element. The wiper element may be separated from the resistive element in response to the displacement sensor being in a parked mode and the wiper element may be in sliding electrical contact with the resistive element in response to the displacement sensor being in a sensing mode. In various embodiments, whether the displacement sensor is in the parked mode or the sensing mode is dependent on actuation of the brake pedal. The displacement sensor may further include an electrically nonconductive wiper lift element disposed between the wiper element and the resistive element in the parked mode.

Also disclosed herein, according to various embodiments, is a brake system of an aircraft. The brake system includes, according to various embodiments, a user input interface, a displacement sensor, a brake assembly, a controller, and a tangible non-transitory memory. The displacement sensor may be coupled to the user input interface and configured to detect displacement of the user input interface. The brake assembly may be coupled to a wheel of the aircraft. The controller may include a processor and the controller may be in electrical communication with the displacement sensor and the brake assembly. The tangible, non-transitory memory may be configured to communicate with the processor. The tangible, non-transitory memory, according to various embodiments, has instructions stored thereon that, in response to execution by the processor, cause the brake system to perform various operations. The various operations include, according to various embodiments, transmitting, by the controller, a null command to the brake assembly and transmitting, by the controller, a braking command to the brake assembly. Transmitting the null command to the brake assembly may be in response to actuation of the user input interface within a deadband threshold and transmitting the braking command to the brake assembly may be in response to actuation of the user input interface exceeding the deadband threshold.

In various embodiments, the displacement sensor includes a resistive element and a wiper element. The wiper element may be separated from the resistive element in response to actuation of the user input interface within the deadband threshold and the wiper element may be in sliding electrical contact with the resistive element in response to actuation of the user input interface exceeding the deadband threshold. The braking command may correspond to a position of the wiper element relative to the resistive element. The user input interface may be a brake pedal or a brake handle, among other mechanisms.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Figure 1:
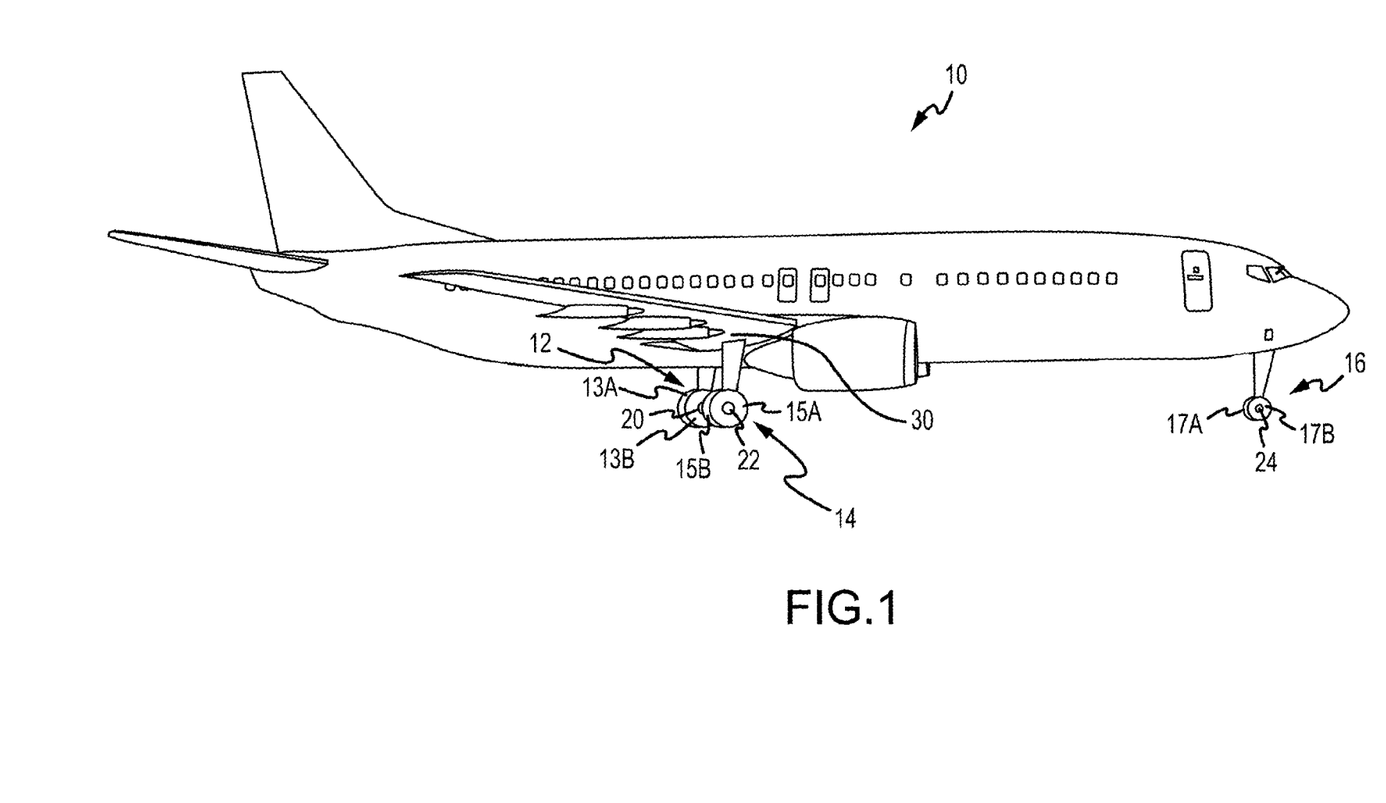
FIG. 1 illustrates an exemplary aircraft having a wheel and brake system, in accordance with various embodiments.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Figure 2:
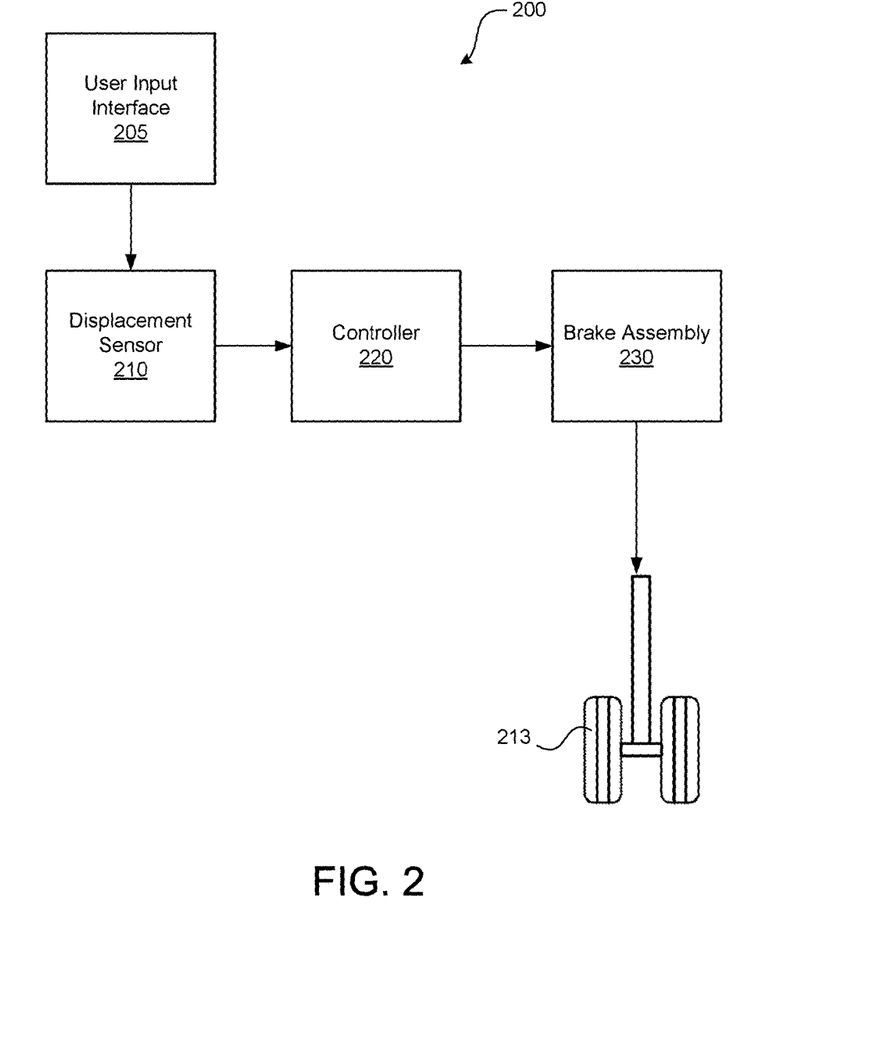
FIG. 2 illustrates a schematic of a brake system, in accordance with various embodiments.

In various embodiments, and with reference to FIG. 2, aircraft 10 may also include one or more brake systems 200. The brake systems 200 of aircraft 10 may include a user input interface 205, a displacement sensor 210, a controller 220, a brake assembly 230, and a wheel 213. As described in greater detail below, the brake system 200 generally controls the braking force and/or torque applied at each wheel 213, according to various embodiments. The brake system 200 may be, for example, a primary brake system, an emergency brake system, a park brake system, etc.

The brake assembly 230 may include a non-rotatable wheel support (for rotatably supporting a wheel) and a brake disk stack. The brake disk stack may have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

The brake assembly 230 may employ fluid powered (hydraulic or pneumatic power) actuator rams or electromechanical actuator arms. For example, the brake assembly 230 may be a hydraulic assembly and thus may be coupled to a power source via a brake servo valve (BSV) and a shutoff valve (SOV). The SOV may effectively function as a shutoff valve such that in response to the valve being in the first position (e.g., an armed position), fluid pressure is permitted to pass through the valve while in response to the valve being in a second position (e.g., a disarmed position), fluid pressure is restricted or prevented from passing through the valve. In various embodiments, the brake assembly 230 is electric and includes an electromechanical actuator controller (EMAC) to control braking. Generally, the brake system 200 receives user input via the user input interface 205, as detected by the displacement sensor 210, and the controller 220 controls the amount of fluid pressure or electromechanical force provided to the actuator ram, thus applying a braking force to the wheel 213.

The controller 220 may be configured to receive a signal from the displacement sensor 210, as described in greater detail below with reference to FIGS. 3A-3D, and translate the signals into a command to be sent to the brake assembly 230. The controller 220 may be integrated into computer systems onboard aircraft 10 such as, for example, a brake control unit (BCU), a full authority digital engine control (FADEC), an engine-indicating and crew-alerting system (EICAS), and/or the like. The controller 220 may also be a standalone computer system separate from aircraft 10 and in electronic communication with aircraft 10, as described in further detail herein. The controller 220 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 220 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the brake system 200 includes one or more user input interfaces 205 for receiving actuation/input from a user. For example, the brake system 200 may be a primary brake system and the user input interface 205 may be a primary brake pedal located in a cockpit of the aircraft 10. The pilot/copilot may push the brake pedal in order to request the application of braking force. In various embodiments, the user input interface 205 may be an emergency brake handle, or other movable mechanical component. The user input interface 205 may be integrated within a cockpit of the aircraft, or may be separate from the cockpit.

The displacement sensor 210, according to various embodiments, detects the displacement of the user input interface 205 from a neutral or "zero" position and communicates the detected signal to the controller 220. The displacement sensor 210 may include any suitable sensor, such as, for example, a linear variable differential transformer (LVDT), a rotary variable differential transformer (RVDT), a potentiometer, a magnetic encoder, and/or the like. The displacement sensor 210 may transmit the a signal as a variable brake signal representative of the displacement of the user input interface 205, which may be a percentage of displacement from a reference position to a maximum reference position.

Figure 3A:
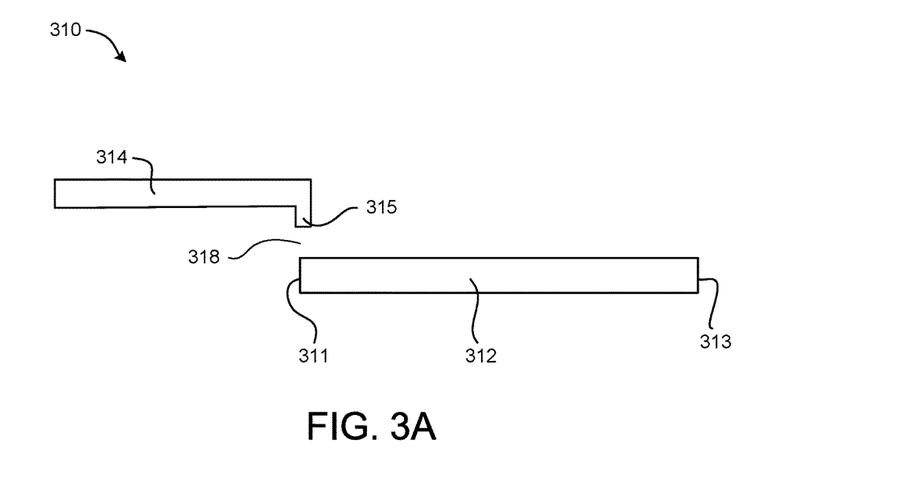
FIG. 3A illustrates a schematic of a displacement sensor in a parked mode, in accordance with various embodiments.
Figure 3B:
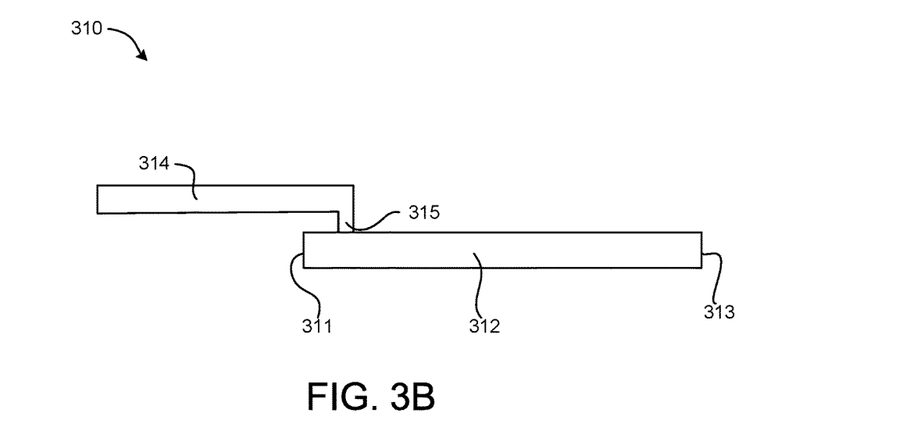
FIG. 3B illustrates a schematic of a displacement sensor in a sensing mode, in accordance with various embodiments.
Figure 3C:
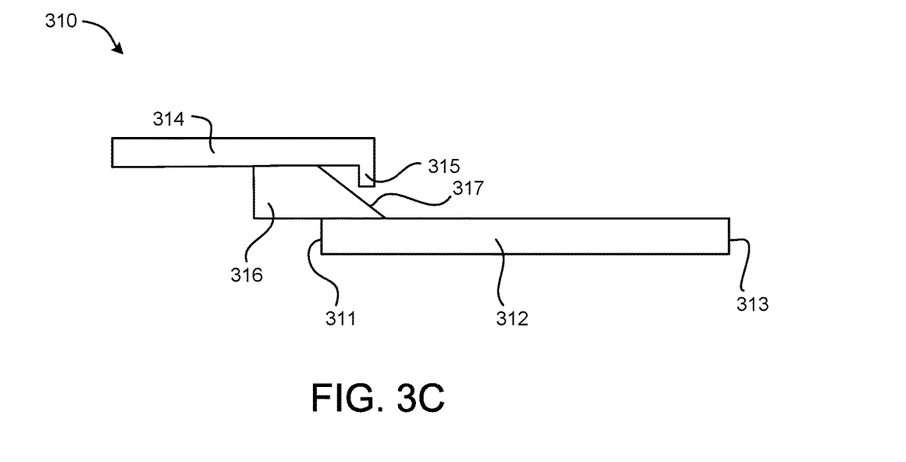
FIG. 3C illustrates a schematic of a displacement sensor in a parked mode, in accordance with various embodiments.

In various embodiments, and with reference to FIGS. 3A-3C, the displacement sensor is a dual-mode potentiometer 310. While numerous details are included above pertaining to aircraft systems and/or brake systems, use of the dual-mode potentiometer 310 is not limited to aircraft and/or braking implementations. Thus, the dual-mode potentiometer 310 disclosed herein may be employed in other applications in which displacement measurements are warranted.

The dual-mode potentiometer 310, according to various embodiments, may be especially beneficial in aircraft braking applications because of aircraft operating conditions. That is, as mentioned above, a conventional displacement sensor employed in a brake system of an aircraft may be damaged as operational vibrations cause contacting surfaces of conventional displacement sensors to wear against each other.

The dual-mode potentiometer 310 of the present disclosure includes a resistive element 312 and a wiper element 314, according to various embodiments. The resistive element 312 may include two electrical terminals 311, 313 on opposing ends of the resistive element 312. The dual-mode potentiometer 310 may operate in either a parked mode or in a sensing mode, as described in greater detail below.

Figure 3D:
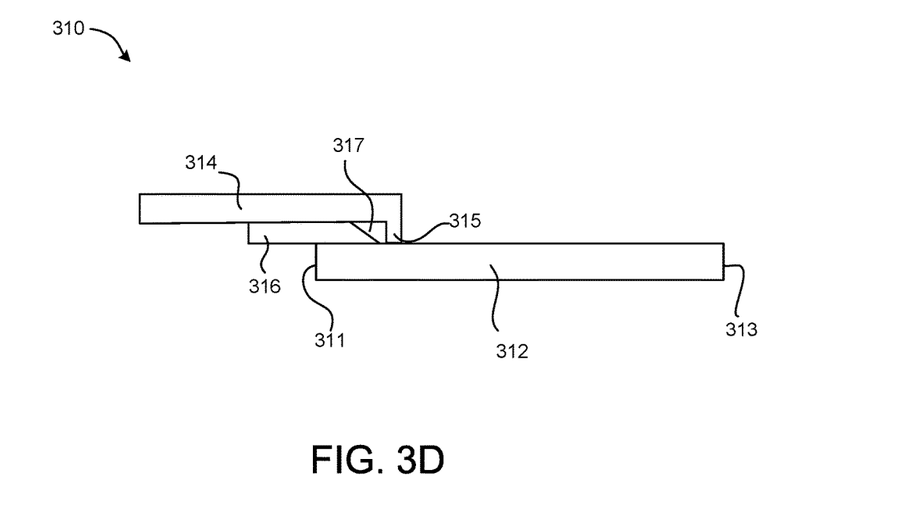
FIG. 3D illustrates a schematic of a displacement sensor in a sensing mode, in accordance with various embodiments.

In various embodiments, and with reference to FIGS. 3B and 3D, in the sensing mode the wiper element 314 is in sliding electrical contact with the resistive element 312. In the sensing mode, the electric potential (e.g., voltage) between either terminal 311, 313 of the resistive element 312 and the wiper element 314 can be measured in order to determine the relative position of the wiper element 314 relative to the resistive element 312. The relative position of the wiper element 314, which is indicative of the position of the user input interface 205 (e.g., brake pedal), may be utilized by the controller 220 to command application of a braking force by the brake assembly 230.

In various embodiments, and with reference to FIGS. 3A and 3C, in the parked mode the wiper element 314 is separated from the resistive element 312 so that a gap 318 is defined between the two elements 312, 314. In various embodiments, the wiper element 314 may include a wiper head 315 and the gap 318 may be defined between the wiper head 315 and the resistive element 312. The gap 318 prevents the elements 312, 314 from wearing against each other. However, because the gap 318 opens the sensing circuit, in the parked mode the dual-mode potentiometer 310 does not detect the relative position of the wiper element 314 along the length of the resistive element 312. In various embodiments, the wiper element 314 is completely decoupled from the resistive element 312 in the parked mode so that vibrations in the resistive element 312 are not conveyed to the wiper element 314.

If displacement measurements of the user input interface 205, with reference to FIG. 2, are warranted, the dual-mode potentiometer 310 can operate in the sensing mode and the position of the wiper element 314 relative to the resistive element 312 can be determined based on the measured electrical voltage. If displacement measurements of the user input interface 205 are not warranted (e.g., during flight or during other, non-braking conditions), the dual-mode potentiometer 310 can operate in the parked mode to prevent wear to surfaces that would otherwise be in contact with each other.

In various embodiments, and with reference to FIGS. 3C and 3D, the dual-mode potentiometer 310 may include an electrically nonconductive wiper lift element 316. The electrically nonconductive wiper lift element 316 may be disposed between the wiper element 314 and the resistive element 312 in the parked mode to maintain the gap 318 between the two elements 312, 314. In various embodiments, the electrically nonconductive wiper lift element 316 has an angled surface 317 along which the wiper element 314 may slide as it transitions between the parked mode and the sensing mode. In various embodiments, the electrically nonconductive wiper lift element 316 may engage a body portion or an arm portion (e.g., not the wiper head 315) of the wiper element 314 to separate the wiper head 315 from the resistive element 312. In various embodiments, the electrically nonconductive wiper lift element 316 may have a geometry and shape that are different from the schematic depiction in FIGS. 3C and 3D. That is, the dual-mode potentiometer 310 of the present disclosure may include other components, mechanisms, or elements that facilitate switching between the parked mode and the sensing mode.

In various embodiments, as mentioned above, a user input interface 205, such as a brake pedal or a brake handle, can be coupled to one of either the resistive element 312 or the wiper element 314. In such embodiments, displacement of the user input interface 205 causes a corresponding displacement of either the resistive element 312 or the wiper element 314. If the dual-mode potentiometer is in the sensing mode, this relative displacement can be measured by the potentiometer and transmitted to the controller 220.

In various embodiments, actuation of the user input interface 205 may be determinative of whether the dual-mode potentiometer 310 is in the parked mode or the sensing mode. Said differently, which mode the dual-mode potentiometer 310 operates in may be dependent on the existence of and/or magnitude of actuation via the user input interface 205. That is, the dual-mode potentiometer 310 may be configured to toggle between the parked mode and the sensing mode in response to actuation of the user input.

In various embodiments, the dual-mode potentiometer 310 may normally (e.g., by default) operate in the parked mode until a certain threshold of actuation via the user input interface 205 is received. For example, if the pilot or copilot does not actuate the user input interface 205 (e.g., does not push the brake pedal) or if the user input interface 205 is only actuated within (e.g., does not exceed) a "deadband" displacement threshold (i.e., an interval, domain, or range of actuation from a zero position), the dual-mode potentiometer 310 may remain in the parked mode, thereby preventing damage to the elements 312, 314 of the dual-mode potentiometer 310 by maintaining a gap 318 between the two elements 312, 314. The "deadband" threshold may be specifically and purposefully designed into the structure of the user input interface 205.

Figure 4A:
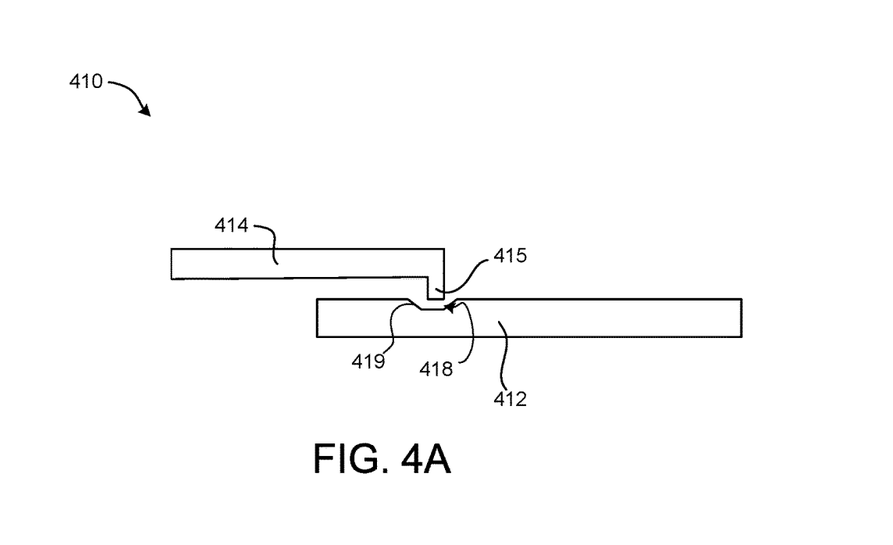
FIG. 4A illustrates a schematic of a displacement sensor in a parked mode, in accordance with various embodiments.
Figure 4B:
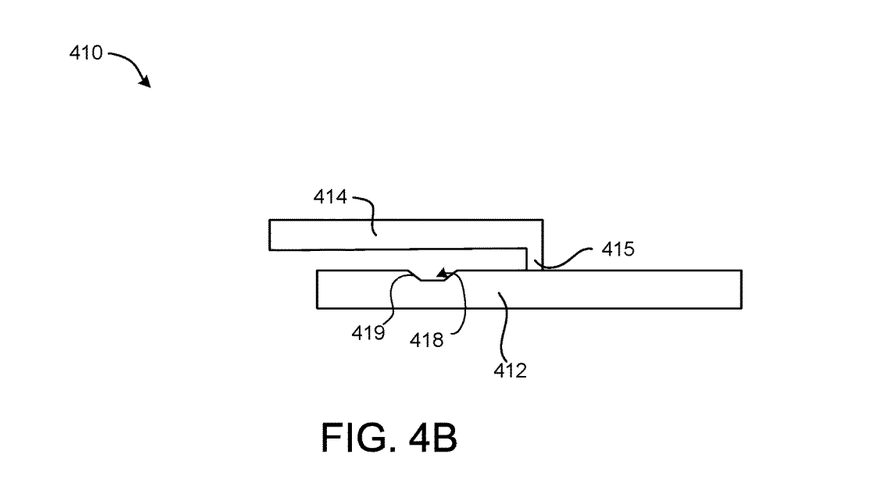
FIG. 4B illustrates a schematic of a displacement sensor in a sensing mode, in accordance with various embodiments.

In various embodiments, and with reference to FIGS. 4A and 4B, the resistive element 412 of the dual-mode potentiometer 410 may have a notch 419 (e.g., channel, groove, depression, etc.) formed on the outer surface of the resistive element 412 that facilitates the gap 418 defined between the wiper element 414 (e.g., the wiper head 415) and the resistive element 412 in the parked mode. The notch 419 may have various shapes or geometries. In various embodiments, relative movement between the resistive element 412 and the wiper element 414, can cause the wiper element 414 to close the gap 418 such that the wiper element 414 is in electrical contact with the resistive element 412 in the sensing mode (FIG. 4B). For example, in various embodiments the wiper element 414 translates linearly and the resistive element 412 is stationary. The dual-mode potentiometer 410 can switch between the parked mode and the sensing mode via linear translation of the wiper element 414 to respectively switch whether the wiper head 415 is disposed over the notch 419 or whether the wiper head 415 is in electrical contact with the resistive element 412.

Figure 5:
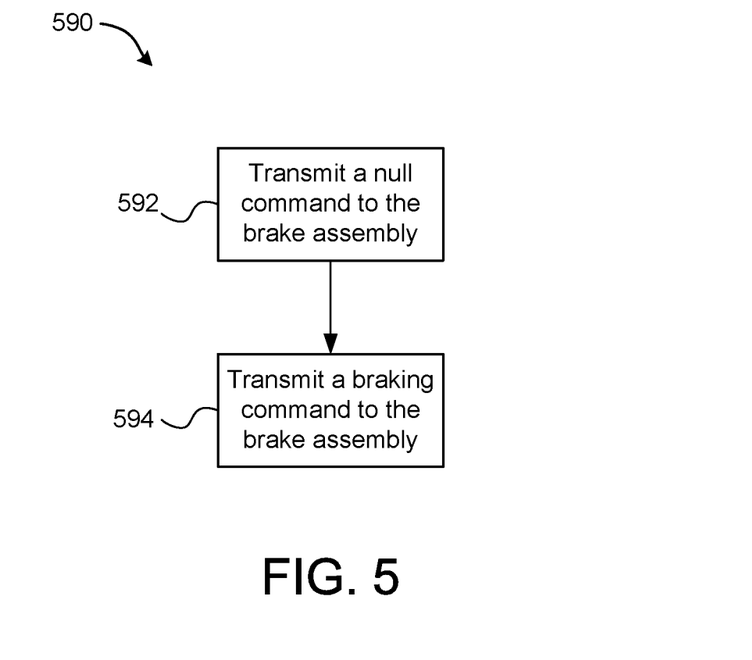
FIG. 5 is a schematic flow chart diagram of a method of controlling a brake system, in accordance with various embodiments.

In various embodiments, and with reference to FIG. 5, a method 590 of controlling the brake system 200 is provided. In various embodiments, in the parked mode, the controller 220 may transmit a null command to the brake assembly 230 at step 592 of the method 590. That is, in response to "no actuation" of the user input interface 205 or in response to actuation of the user input interface 205 within a deadband threshold, no braking command may be sent by the controller 220 to the brake assembly 230. In various embodiments, the controller 220 may send a command that indicates "no braking" to the brake assembly 230. In response the pilot or copilot actuating the user input interface 205 (e.g., pushing on the brake pedal) or actuating the user input interface 205 beyond the deadband displacement threshold, the dual-mode potentiometer 310 changes to the sensing mode to measure electric potential (i.e., voltage) to detect the extent of the displacement of the user input interface 205. That is, in response to actuation of the user input interface 205 or in response to actuation that exceeds the deadband threshold, a braking command may be transmitted, by the controller 220 to the brake assembly 230 at step 594 of the method 590, in accordance with various embodiments and with reference to FIG. 5. The braking command may correspond to the measured displacement of the user input interface 205.

In various embodiments, the resistive element 312 of the dual-mode potentiometer 310 may be made from various materials, include metal, ceramic, and/or conductive plastic, among others. In various embodiments, the components of the dual-mode potentiometer 310, such as the resistive element 312, may be made from less expensive materials than would otherwise be possible with conventional displacement sensors because of the wear-preventing ability of the parked mode.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A displacement sensor comprising:
   a resistive element; and
   a wiper element;
   wherein the wiper element is separated from the resistive element in response to the displacement sensor being in a parked mode and wherein the wiper element is in sliding electrical contact with the resistive element in response to the displacement sensor being in a sensing mode;
   wherein whether the displacement sensor is in the parked mode or the sensing mode is dependent on actuation of a user input interface that is configured to be coupled to at least one of the resistive element and the wiper element; and
   wherein the displacement sensor is configured to toggle between the parked mode and the sensing mode in response to actuation of the user input interface.

2. The displacement sensor of claim 1, wherein the displacement sensor defaults to the parked mode in response to no actuation of the user input interface.

3. The displacement sensor of claim 2, wherein the displacement sensor changes to the sensing mode in response to a threshold actuation of the user input interface.

4. The displacement sensor of claim 3, wherein the threshold actuation comprises a deadband displacement of the user input interface.

5. The displacement sensor of claim 1, wherein the user input interface is a brake pedal.

6. The displacement sensor of claim 1, wherein the user input interface is a brake handle.

7. The displacement sensor of claim 1, wherein the resistive element comprises a notch and the wiper element comprises a wiper head, wherein the wiper head is disposed in the notch in the parked mode such that the wiper head is separated from the resistive element.

8. The displacement sensor of claim 1, further comprising an electrically nonconductive wiper lift element, wherein the electrically nonconductive wiper lift element is disposed between the wiper element and the resistive element in the parked mode.

9. The displacement sensor of claim 8, wherein the electrically nonconductive wiper lift element has an angled surface along which the wiper element slides.

10. The displacement sensor of claim 1, wherein the resistive element is made from conductive plastic.

11. The displacement sensor of claim 1, wherein the resistive element is made from a ceramic material.

12. A displacement sensor comprising:
    a resistive element; and
    a wiper element;
    wherein the wiper element is separated from the resistive element in response to the displacement sensor being in a parked mode and wherein the wiper element is in sliding electrical contact with the resistive element in response to the displacement sensor being in a sensing mode; and
    wherein the resistive element comprises a notch and the wiper element comprises a wiper head, wherein the wiper head is disposed in the notch in the parked mode such that the wiper head is separated from the resistive element.

13. The displacement sensor of claim 12, wherein whether the displacement sensor is in the parked mode or the sensing mode is dependent on actuation of a user input interface that is configured to be coupled to at least one of the resistive element and the wiper element.

14. The displacement sensor of claim 13, wherein the displacement sensor is configured to toggle between the parked mode and the sensing mode in response to actuation of the user input interface.

15. The displacement sensor of claim 13, wherein the electrically nonconductive wiper lift element is disposed between the wiper element and the resistive element in the parked mode.

16. A displacement sensor comprising:
    a resistive element;
    a wiper element; and
    an electrically nonconductive wiper lift element;
    wherein the wiper element is separated from the resistive element in response to the displacement sensor being in a parked mode and wherein the wiper element is in sliding electrical contact with the resistive element in response to the displacement sensor being in a sensing mode; and
    wherein the electrically nonconductive wiper lift element is disposed between the wiper element and the resistive element in the parked mode.

17. The displacement sensor of claim 16, wherein whether the displacement sensor is in the parked mode or the sensing mode is dependent on actuation of a user input interface that is configured to be coupled to at least one of the resistive element and the wiper element.

18. The displacement sensor of claim 17, wherein the displacement sensor is configured to toggle between the parked mode and the sensing mode in response to actuation of the user input interface.

19. The displacement sensor of claim 16, wherein the resistive element comprises a notch and the wiper element comprises a wiper head, wherein the wiper head is disposed in the notch in the parked mode such that the wiper head is separated from the resistive element.

* * * * *